US009626199B2

(12) United States Patent
Edwards et al.

(10) Patent No.: US 9,626,199 B2
(45) Date of Patent: Apr. 18, 2017

(54) TECHNIQUES FOR OVERLAYING A CUSTOM INTERFACE ONTO AN EXISTING KIOSK INTERFACE UTILIZING NON-VISIBLE TAGS INTO SCREEN DEFINITIONS OF THE EXISTING INTERFACE

(75) Inventors: Thomas V. Edwards, Suwanee, GA (US); Daniel Francis Matteo, Lake Mary, FL (US)

(73) Assignee: NCR Corporation, Duluth, GA (US)

( * ) Notice: Subject to any disclaimer, the term of this patent is extended or adjusted under 35 U.S.C. 154(b) by 616 days.

(21) Appl. No.: 13/370,055

(22) Filed: Feb. 9, 2012

(65) Prior Publication Data

US 2013/0211833 A1 Aug. 15, 2013

(51) Int. Cl.
| | |
|---|---|
| G10L 15/00 | (2013.01) |
| H04M 3/00 | (2006.01) |
| G06Q 40/00 | (2012.01) |
| G06F 9/44 | (2006.01) |
| H04M 3/436 | (2006.01) |
| G06Q 20/10 | (2012.01) |
| G10L 15/26 | (2006.01) |
| G07F 19/00 | (2006.01) |
| G07F 7/10 | (2006.01) |
| G07F 9/02 | (2006.01) |
| G10L 13/00 | (2006.01) |

(52) U.S. Cl.
CPC ....... *G06F 9/4446* (2013.01); *G06Q 20/1085* (2013.01); *G07F 7/1041* (2013.01); *G07F 9/023* (2013.01); *G07F 19/211* (2013.01); *G10L 15/265* (2013.01); *H04M 3/436* (2013.01); *G10L 13/00* (2013.01); *G10L 15/26* (2013.01)

(58) Field of Classification Search
CPC ... G10L 15/265; H04M 3/436; G06Q 20/1085
USPC .............................. 704/235; 379/196; 705/43
See application file for complete search history.

(56) References Cited

U.S. PATENT DOCUMENTS

| | | | | |
|---|---|---|---|---|
| 6,731,731 | B1 * | 5/2004 | Ueshima | 379/196 |
| 2005/0273626 | A1 * | 12/2005 | Pearson et al. | 713/186 |
| 2011/0184865 | A1 * | 7/2011 | Mon et al. | 705/43 |
| 2013/0073467 | A1 * | 3/2013 | Underwood | 705/71 |

* cited by examiner

*Primary Examiner* — Farzad Kazeminezhad
(74) *Attorney, Agent, or Firm* — Schwegman, Lundberg & Woessner

(57) ABSTRACT

Techniques for overlaying a custom interface onto an existing kiosk interface are provided. An event is detected that triggers a kiosk to process an agent that overlays, and without modifying, the kiosk's existing interface. The agent alters screen features and visual presentation of the existing interface and provides additional alternative operations for navigating and executing features defined in the existing interface. In an embodiment, the agent provides a custom interface overlaid onto the existing interface to provide a customer-facing interface for individuals that are sight impaired, and the method further comprises injecting non-visible tags into screen definitions for the existing interface that are recognized only by the agents to handle exception conditions and actively ignored by the existing interface.

18 Claims, 3 Drawing Sheets

TECHNIQUES FOR OVERLAYING A CUSTOM INTERFACE ONTO AN EXISTING KIOSK INTERFACE UTILIZING NON-VISIBLE TAGS INTO SCREEN DEFINITIONS OF THE EXISTING INTERFACE

BACKGROUND

Consumers are increasingly using kiosks to conduct business with enterprises. The kiosks come in a variety of sizes and are used for a variety of purposes. Some kiosks are drive through, such as fast food establishments, pharmacies, banks, and the like. Other kiosks are stationary located in gas stations, airlines, grocery stores, department stores, and the like.

In addition, what is considered a kiosk is evolving with today's technology. For example, digital signs now provide advertisements and mechanisms for users to interact with the displays to perform transactions. Such mechanisms include blue tooth communication, Near Field Communication (NFC), Quick Response (QR) code scanning, WiFi communication, and the like.

So, increasingly customers are engaging in a variety of technologies to automatically interact with enterprises to perform transactions. The transactions may result in purchases or may result in such things as registration for loyalty programs, enrolling in promotional events, requesting additional information for a good or service, and others. That is, the transactions via these kiosks are not strictly tied to purchases although some transactions are purchase related.

As kiosks become more pervasive in today's marketplace, more and more people with disabilities are being left behind because the interfaces of most kiosks do not adequately account for an individual's disabilities.

As a result, the government is pressing more and more for kiosks to become compliant with the American with Disabilities Act (ADA). Heretofore, the industry has resisted compliance due to the perceived cost associated with redoing and redeploying interfaces for existing kiosks. Thus, very few kiosks properly comply with what the government considers appropriate for individuals with disabilities, such as the sight impaired.

Also, when someone with a disability is unable to access goods and services on his/her own they become more dependent on society or loved ones and add to the cost that society must pay to care for him/her.

SUMMARY

In various embodiments, techniques for overlaying a custom interface onto an existing kiosk interface are presented. According to an embodiment, a method for overlaying a custom interface onto an existing kiosk interface is provided.

Specifically, an event, at a kiosk, is detected that triggers a change in mode of operation for the kiosk. Next, the kiosk acquires configuration information for the changed mode and one or more references to agents that interact with an existing interface of the kiosk. The configuration information defines additional visual information and placement for the additional visual information and existing visual information for the existing interface. Then, the kiosk processes the one or more agents to overlay the additional visual information and the existing visual information in the placement defined by the configuration information on a display of the kiosk. Finally, the kiosk and a user interact with one another; the user navigates and transacts with the kiosk using the additional visual information and the agents overlaid on top the existing interface.

DETAILED DESCRIPTION

Figure 1:
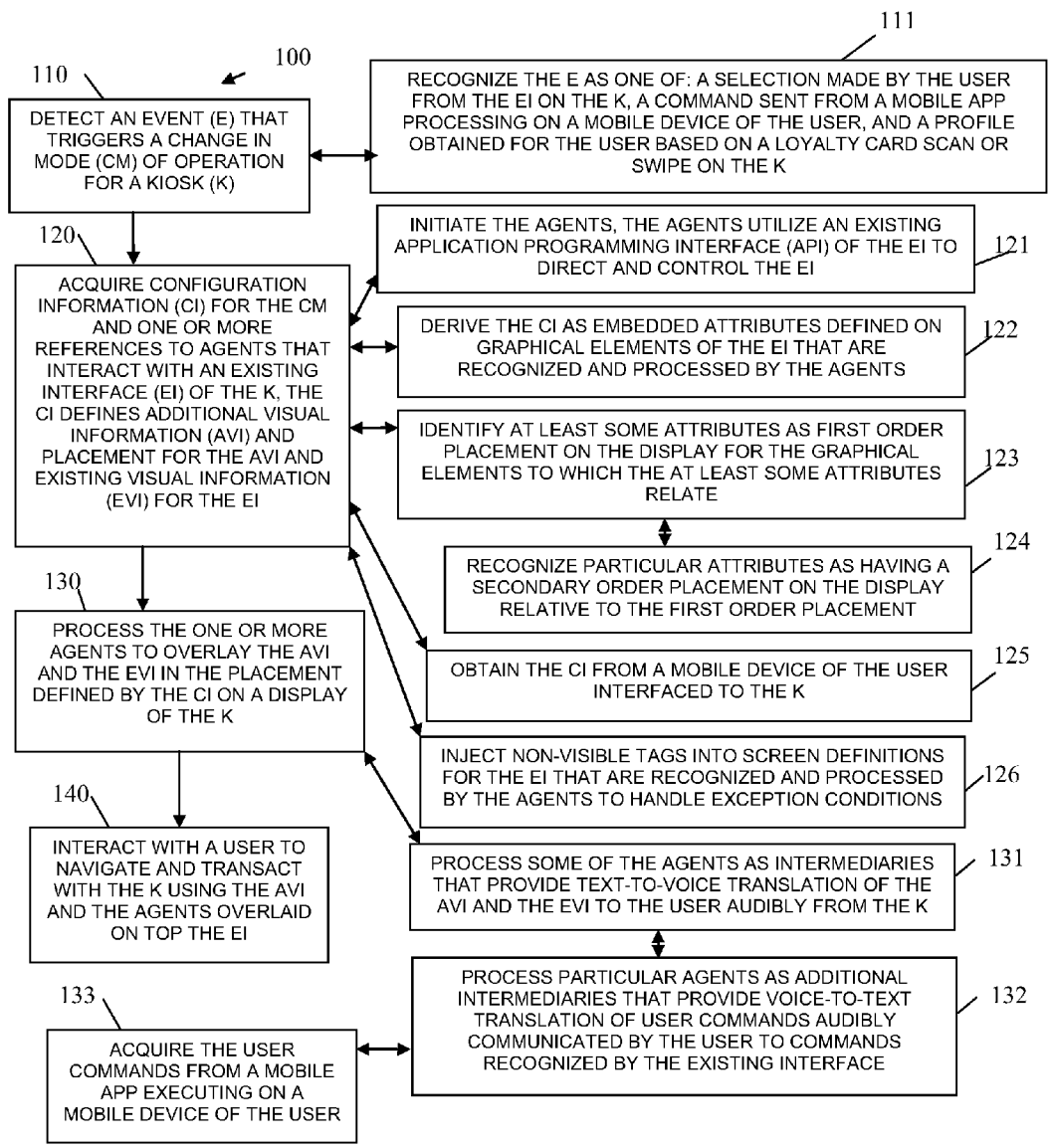
FIG. 1 is a diagram of a method for overlaying a custom interface onto an existing kiosk interface, according to an example embodiment.

FIG. 1 is a diagram of a method 100 for overlaying a custom interface onto an existing kiosk interface, according to an example embodiment. The method 100 (hereinafter "custom kiosk interface overlay manager") is implemented as instructions programmed and residing on a non-transitory computer-readable (processor-readable) storage medium and executed by one or more processors. The processors are specifically configured and programmed to process the custom kiosk interface overlay manager. The custom kiosk interface overlay manager operates over a network. The network is wired, wireless, or a combination of wired and wireless.

The custom kiosk interface overlay manager executes on one or more processors of a kiosk. In some embodiments, the custom kiosk interface overlay manager operates in a cloud processing environment and is available as a cloud service over the Internet to send dynamic configuration instructions to a kiosk to overlay a custom interface on the kiosk.

In some instances, the custom kiosk interface overlay manager interacts with consumer mobile device apps, applications and services of enterprise systems, and/or other third-party services utilized by consumers and/or enterprises for transaction processing, loyalty processing, and/or other customer relationship management processing.

Various embodiments of the techniques presented herein provide extensions to typical screen layout descriptions that can, in combination with changes at the rendering level (via a rendering agent), allow any application to provide a custom interface overlay to existing kiosk interfaces, such as interfaces for the sight impaired for use in ADA compliance.

The techniques recognize that extensions to graphic elements are readily permitted (as additional attributes) and can provide narrative text storage, and tab order. Multiple levels of tab order are recognized; a primary level, which moves between the main screen headings and areas ultimately including the control buttons (ok, cancel, help, etc.), and a secondary tab order used within screen areas that present functional options such as "Cash Back Amount; $20, $40, $60, $80 or $100" (for Automated Teller Machines (ATM)—a type of kiosk). Controls may be defined, which are not visible that allow additional text to be defined and presented in tab order without disrupting the visible buttons of the existing kiosk interface.

Tags are defined and injected into the screen definitions for any exception handling requirements, thereby permitting a default behavior to be defined that only needs overridden for exception conditions.

Moreover, in some cases, an insertion of a headphone jack into a kiosk port or recognition of a Blue Tooth connection with a mobile device of a consumer enables certain features within the kiosk. So, in some circumstances, text-to-speech is used to generate audio from the configured textual descriptions. The text speaker can be interrupted at any point with navigation commands. Moreover, voice-to-text can be used to navigate an existing kiosk interface that was never designed to provide such features, via the custom overlaid interface.

Navigation commands are derived from messages sent to the User Interface (UI) engine from a physical keyboard device. Typically, and as one example, commands include move (Left (L), Right (R), Up (U), and Down (D)), tab, enter and cancel. Key stroke events may be generated from a distinct device (consumer mobile phone and the like) or from an existing device (including the touch screen used with the existing kiosk interface) with reserved area definitions representing keystrokes, etc.

As will be detailed more completely herein and below, the approaches presented can be used to extend any solution using a configurable UI to provide ADA sight impaired compliance (or user-specific disability) without modification of the underlying legacy kiosk interface application. This greatly speeds application compliance with new and changing ADA laws, lowers the cost and risk of compliance changes. Moreover, because the narrative is represented in simple text it is easily extended or modified by the solution owner to achieve a custom interface overlaid onto an existing and legacy kiosk interface.

At 110, the custom kiosk interface overlay manager detects an event that triggers a change in mode of operation for the kiosk. That is, the kiosk that the custom kiosk interface overlay manager executes on includes a legacy interface that processes in its existing interface mode of operation until an event is detected that changes that mode of operation in accordance with what is described herein.

According to an embodiment, at 111, the custom kiosk interface overlay manager recognizes the event as one of: a selection made by the user from the existing interface on the kiosk; a command sent from a mobile app processing on a mobile device of the user; and a profile obtained for the user based on a loyalty card scanned, inputted, or swiped on the kiosk.

At 120, the custom kiosk interface overlay manager acquires configuration information for the changed mode of operation and for one or more references to agents that interact with an existing interface of the kiosk. The configuration information defines additional visual information and placement for the additional visual information and existing visual information for the existing interface. The kiosk knows how to respond and transact via the legacy and existing interface and the configuration information combined with the agents provide an overlay interface for a user to use that is user-facing but underneath utilizes the existing commands of the legacy kiosk interface.

In an embodiment, at 121, the custom kiosk interface overlay manager initiates the agents for execution on the kiosk. The agents utilize an existing Application Programming Interface (API) of the existing interface to direct and control the existing interface. So, the custom kiosk interface overlay manager presents a new interface but underneath communicates with the kiosk via the legacy and existing interface of the kiosk.

In another situation, at 122, the custom kiosk interface overlay manager derives the configuration information as embedded attributes defined on graphical elements of the existing interface that are recognized and processed by the agents. So, the existing interface does not need to know or recognize the extended attributes placed on the graphical elements, since the agents will recognize the extended attributes and communicate with the existing interface utilizing the API of the existing interface.

In one case, at 123, the custom kiosk interface overlay manager identifies at least some attributes as first order placement on the display for the graphical elements to which the at least some attributes relate. So, as discussed above graphical tabs may include a ordering and placement within the display of the kiosk that are defined via the attributes.

Continuing with the embodiment of 123 and at 124, the custom kiosk interface overlay manager recognizes particular attributes as having a secondary order placement on the display relative to the first order placement. Again, such a situation was discussed above where existing operations of the existing interface are placed in a second order relative to the first order placement of graphical tabs.

In a situation, at 125, the custom kiosk interface overlay manager obtains the configuration information from a mobile device of the user interfaced to the kiosk. So, the user can carry the definition and references to the used agents on the mobile device via a mobile app and communicate the overlay interface (combination of configuration information and the agents) dynamically to the kiosk and correspondingly the custom kiosk interface overlay manager via a network connection.

According to an embodiment, at 126, the custom kiosk interface overlay manager injects non-visible tags into screen definitions for the existing interface that are recognized and processed by the agents to handle exception processing. Again, such tags may not, in some cases, be recognized and may be actively ignored by the existing interface and its API since the agents recognize and process the tags.

At 130, the custom kiosk interface overlay manager processes the one or more agents to overlay the additional visual information and the existing visual information in the placement defined by the configuration information on a display of the kiosk.

In an embodiment, at 131, the custom kiosk interface overlay manager processes some of the agents as intermediaries that provide text-to-speech or voice translation of the additional visual information and the existing visual information to the user in an audible manner from the kiosk. This may be useful for blind individuals that are more than simply visually impaired.

Continuing with the embodiment of 131 and at 132, the custom kiosk interface overlay manager processes particular agents as additional intermediaries that provide speech of voice-to-text translation of user commands that are audibly communicated by the user to commands recognized by the existing interface.

Still continuing with the embodiment of 132 and at 133, the custom kiosk interface overlay manager acquires the user commands from a mobile app executing on a mobile device of the user.

At 140, the custom kiosk interface overlay manager interacts with the user to navigate and transact with the kiosk using the additional visual information and the agents overlaid on top of the existing interface.

The overlaid interface is customized for preferences and/or disabilities of the user. It is noted that this is particular useful for the sight impaired or elderly users but can also be customized for those that are mentally challenged or even technology illiterate.

Figure 2:
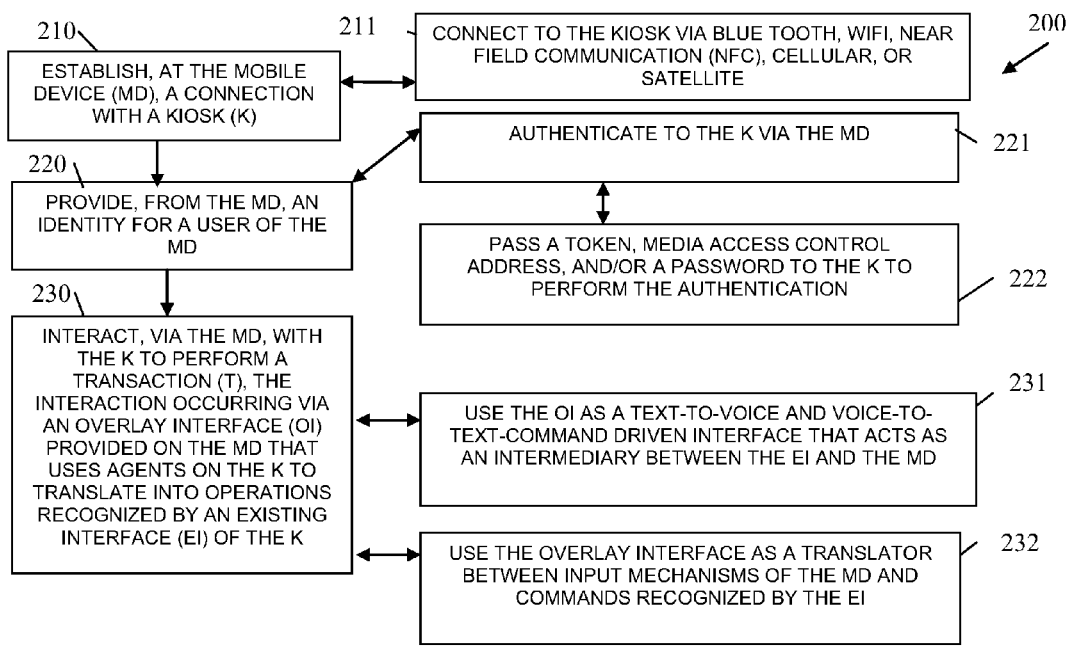
FIG. 2 is a diagram of another method for overlaying a custom interface onto an existing kiosk interface, according to an example embodiment.

FIG. 2 is a diagram of another method 200 for overlaying a custom interface onto an existing kiosk interface, according to an example embodiment. The method 200 (hereinafter "mobile app") is implemented as instruction and programmed within a non-transitory computer-readable (processor-readable) storage medium that executes on one or more processors of a mobile device (e.g., mobile phone, personal digital assistant (PDA), tablet, laptop, etc.); the processors of the mobile device are specifically configured to execute the mobile app. The mobile app is operational over a network; the network is wired, wireless, or a combination of wired and wireless.

The mobile app is controlled by a consumer (customer and/or user) and interacts with the custom kiosk interface overlay manager, represented by the method 100 of the FIG. 1.

It is noted that the mobile app can be installed and initiated by the consumer on the mobile device in a variety of manners before the processing occurs as detailed below. For instance, in one situation during a registration process of the mobile device with enterprise loyalty system, the mobile app is downloaded and initiated on the mobile device. In another instance, during an initial contact by the mobile device by activating a QR code for a first time that represents a unique transaction code for a retailer, the preference configuring service is automatically contacted and downloads and installs on the mobile device and initiates a registration process. The remaining processing described for the mobile app assumes the mobile app is installed and executing on a mobile device of a consumer.

At 210, the mobile app establishes, at the mobile device, a connection with the kiosk. This connection can occur over a variety of networks and in a variety of manners some initiated by the user and some automatically occurring.

For example, at 211, the mobile app connects to the kiosk via Blue Tooth, WiFi, NFC, cellular, or satellite.

The connection can be initiated by the kiosk detecting the mobile device within a predefined range of the kiosk or can be initiated by the user via the mobile app that detects and reports the presence of the kiosk. This may be audible communication to the user via the mobile device.

At 220, the mobile app provides, from the mobile device, an identity for the user of the mobile device. Again, this can be an interactive process or an automated process.

For example, at 221, the mobile app authenticates to the kiosk via the mobile device.

Continuing with the embodiment of 221 and at 222, the mobile app passes a token, media access control address for the mobile device, and/or a password to the kiosk in order for the kiosk to perform the authentication. Authentication provides the identity of the user to the kiosk and a backend enterprise system associated with the kiosk.

In still other cases, the user can scan, input, or swipe a loyalty card to provide the identity of the user to the kiosk and the backend enterprise system associated with the kiosk.

At 230, the mobile app interacts, via the mobile device, with the kiosk to perform a transaction. The interaction occurring via an overlay interface provided on the mobile device that uses agents on the kiosk to translate operations recognized by an existing interface of the kiosk.

In an embodiment, at 231, the mobile app uses the overlay interface as text-to-voice and voice-to-text command driven interface that acts as an intermediary between the existing interface and the mobile device.

In still another case, at 232, the mobile app uses the overlay interface as a translator between input mechanisms of the mobile device and commands recognized by the existing interface.

FIG. 1 described, primarily, overlaying a custom interface on to an existing interface of a kiosk to provide improved navigation and ease of user to users in need of such an interface (such as those with disabilities); whereas FIG. 2 describes providing the overlay interface via a mobile device of the user. In some cases, the mobile device is a phone but for sight impaired individuals the mobile device may more beneficially be a tablet with larger screen images and easier navigation capabilities.

Figure 3:
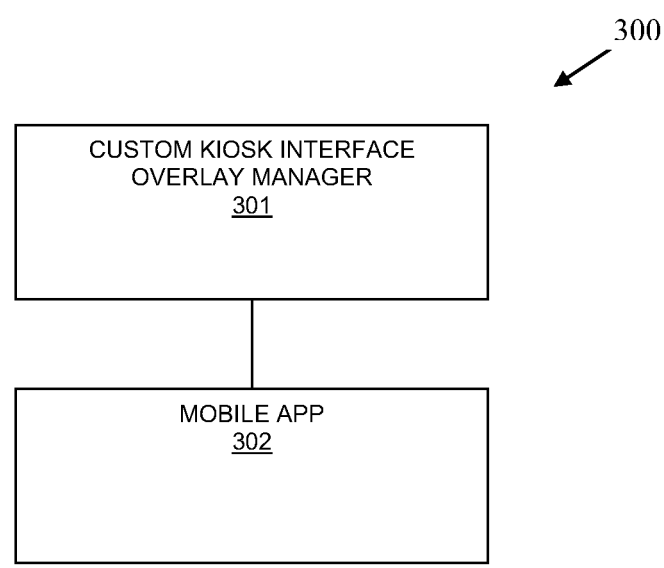
FIG. 3 is a diagram of custom overlay interface system, according to an example embodiment.

FIG. 3 is a diagram of custom overlay interface system 300, according to an example embodiment. The components of the custom overlay interface system 300 are implemented as executable instructions and programmed within a non-transitory computer-readable (processor-readable) storage medium that execute on one or more processors of a kiosk (e.g., self-service kiosk, Automated Teller Machine (ATM), etc.) and in some instances a mobile device (e.g., phone, tablet, laptop, etc.); the processors of the kiosk and the mobile device (as the case may be) are specifically configured to execute the components of the custom overlay interface system 300. The custom overlay interface system 300 is operational over a network; the network is wired, wireless, or a combination of wired and wireless.

The FIG. 1 described the processing for overlaying a custom interface onto an existing kiosk interface from the perspective of the kiosk. The FIG. 2 described the processing from the perspective of the consumer's mobile app on a consumer's mobile device; and the custom overlay interface system 300 describes the processing for transacting from both the kiosk's and the mobile device's perspectives.

The custom overlay interface system 300 includes a custom kiosk interface overlay manager 301 and a mobile app 302. Each of these and their interactions with one another will now be discussed in turn.

The custom overlay interface system 300 includes a kiosk having one or more processors that execute the custom kiosk interface overlay manager 301, which is implemented, programmed, and resides within a non-transitory computer-readable storage medium. Example processing associated with the custom kiosk interface overlay manager 301 was presented above in detail with reference to the FIG. 1.

The custom kiosk interface overlay manager 301 is configured to overlay an interface on top of an existing interface of the kiosk and provide one or more aspects of the overlaid interface to the mobile app 302 for a user to transact with the kiosk via the overlay interface.

The custom overlay interface system 300 also includes a mobile app 302 that is configured to execute on one or more processors of a mobile device, such as a mobile phone, a tablet, a laptop, etc. Example processing associated with the mobile app 302 was presented above in detail with reference to the FIG. 2.

The mobile app 302 is configured to connect to the kiosk and the custom kiosk interface overlay manager 301 and utilizes the overlay interface provided by the custom kiosk interface overlay manager 301 for the user to transact with the kiosk, via the underlying existing interface of the kiosk.

In an embodiment, the mobile device is a mobile phone, a tablet, or a laptop.

In still another case, the kiosk is an Automated Teller Machine (ATM). In other cases, the kiosk is any self-service enterprise kiosk designed to provide customer information and/or sell goods or services of the enterprise.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A processor-implemented method programmed in a non-transitory processor-readable medium and to execute on one or more processors of a kiosk configured to execute the method, comprising:
   detecting, at the kiosk, an event that triggers a change in mode of operation for the kiosk, and detecting the event as a command sent directly from a mobile device of a user to the kiosk once the kiosk detects the mobile device within a predefined range of the kiosk and initiates a connection to the mobile device by the kiosk sending an audible communication to the mobile device of the user indicating that the mobile device is within the predefined range;
   acquiring, by the kiosk, configuration information for the changed mode and one or more references to agents that interact with an existing interface of the kiosk, the configuration information defining additional visual information and placement for the additional visual information and existing visual information for the existing interface, wherein the acquiring further includes injecting non-visible tags into screen definitions for the existing interface that are recognized and processed by the agents to handle exception conditions, wherein the said non-visible tags are actively ignored by the existing interface of the kiosk;
   processing, by the kiosk, the one or more agents to overlay the additional visual information and the existing visual information in the placement defined by the configuration information on a display of the kiosk, the additional visual information relevant to the user who is a sight impaired user transacting at the kiosk; and
   interacting, via the kiosk, with the user to navigate and transact with the kiosk using the additional visual information and the agents overlaid on top of the existing interface.

2. The method of claim 1, wherein processing further includes processing some of the agents as intermediaries that provide text-to-voice translation of the additional visual information and the existing visual information to the user audibly.

3. The method of claim 2, wherein processing further includes processing particular agents as additional intermediaries that provide voice-to-text translation of user commands audibly communicated by the user to commands recognized by the existing interface.

4. The method of claim 3, wherein processing further includes acquiring the user commands from a mobile app executing on a mobile device of the user.

5. The method of claim 1, wherein acquiring further includes identifying at least some attributes as a first order placement on the display for the graphical elements to which the at least some attributes relate.

6. The method of claim 5, wherein identifying further includes recognizing particular attributes as having a secondary order placement on the display relative to the first order placement.

7. The method of claim 1, wherein acquiring further includes initiating the agents, wherein the agents utilize an existing Application Programming Interface (API) of the existing interface to direct and control the existing interface.

8. The method of claim 1, wherein acquiring further includes deriving the configuration information as embedded attributes defined on graphical elements of the existing interface that are recognized and processed by the agents.

9. The method of claim 1, wherein acquiring further includes obtaining the configuration information from a mobile device of the user interfaced to the kiosk.

10. A processor-implemented method programmed in a non-transitory processor-readable medium and to execute on one or more processors of a mobile device configured to execute the method, comprising:
    establishing, at the mobile device, a connection with a kiosk, the connection initiated by the kiosk upon the kiosk detecting that the mobile device is within a predefined range of the kiosk and the kiosk sending an audible communication to the mobile device relevant to detecting the mobile device within the predefined range as an indication to the mobile device that the mobile device is within the predefined range of the kiosk;
    providing, from the mobile device, an identity for a user of the mobile device; and
    interacting, via the mobile device, with the kiosk to perform a transaction, the interaction occurring via an overlay interface provided on the mobile device that uses agents on the kiosk to translate into operations recognized by an existing interface of the kiosk;
    wherein the interacting further includes injecting non-visible tags into screen definitions for the existing interface that are recognized and processed by the agents to handle exception conditions, wherein the said non-visible tags are actively ignored by the existing interface of the kiosk.

11. The method of claim 10, wherein providing further includes authenticating to the kiosk via the mobile device.

12. The method of claim 11, wherein authenticating further includes passing a token, media access control address, and/or a password to the kiosk to perform the authentication.

13. The method of claim 10, wherein establishing further includes connecting to the kiosk via Blue Tooth, WiFi, Near Field Communication (NEC), cellular, or satellite.

14. The method of claim 10, wherein interacting further includes using the overlay interface as a text-to-voice and voice-to-text-command driven interface that acts as an intermediary between the existing interface and the mobile device.

15. The method of claim 10, wherein interacting further includes using the overlay interface as a translator between input mechanisms of the mobile device and commands recognized by the existing interface.

16. A system comprising:
    a kiosk configured with a custom kiosk interface overlay manager that executes on the kiosk and is implemented and resides in a non-transitory computer-readable storage medium;

and a mobile app implemented and residing in a non-transitory computer-readable storage medium that processes on a mobile device;

wherein the custom kiosk interface overlay manager is configured to overlay an interface on top of an existing interface of the kiosk including injecting non-visible tags into screen definitions for the existing interface that are recognized and processed by agents to handle exception conditions, wherein the said non-visible tags are actively ignored by the existing interface of the kiosk, and provide one or more aspects of the overlaid interface to the mobile app for a user to transact with the kiosk via the overlay interface, the kiosk initiating a connection with the mobile device when the mobile device is detected within a predefined range of the kiosk and the kiosk sending an audible communication to the mobile device relevant to the mobile device being detected within the predefined range of the kiosk and the audible communication indicating to the mobile device that the mobile device is within the predefined range of the kiosk and the overlaid interface relevant to a visually impaired user.

17. The system of claim 16, wherein the mobile device is a mobile phone, a tablet, or a laptop.

18. The system of claim 16, wherein the kiosk is an Automated Teller Machine (ATM).

* * * * *